Oct. 24, 1939.  V. G. ELLIS  2,177,246
TRIPOD STABILIZER
Filed Jan. 28, 1938  2 Sheets-Sheet 1
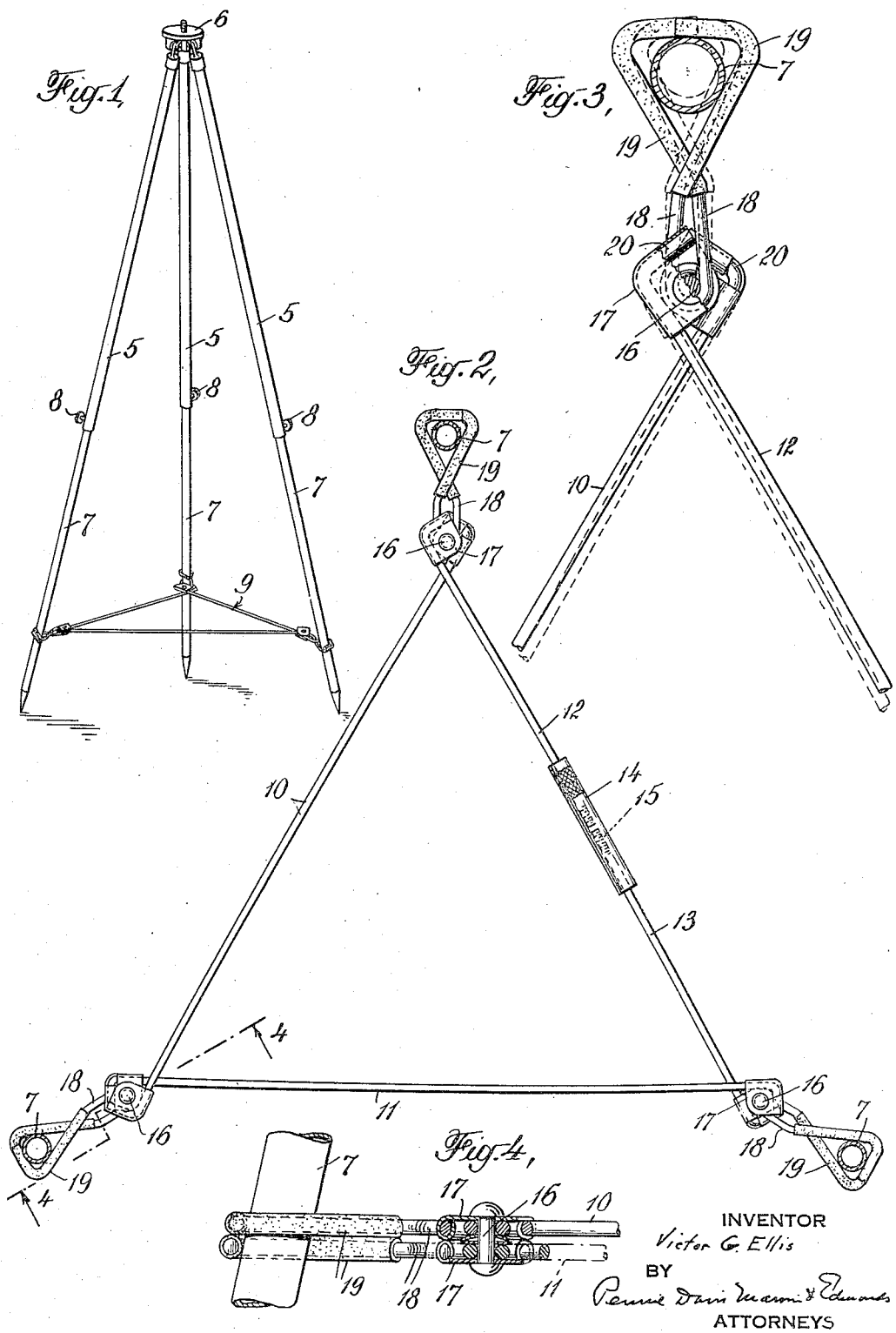
INVENTOR
Victor G. Ellis
BY
Pennie Davis Marvin & Edmonds
ATTORNEYS Oct. 24, 1939.　　　　V. G. ELLIS　　　　2,177,246
TRIPOD STABILIZER
Filed Jan. 28, 1938　　　2 Sheets-Sheet 2
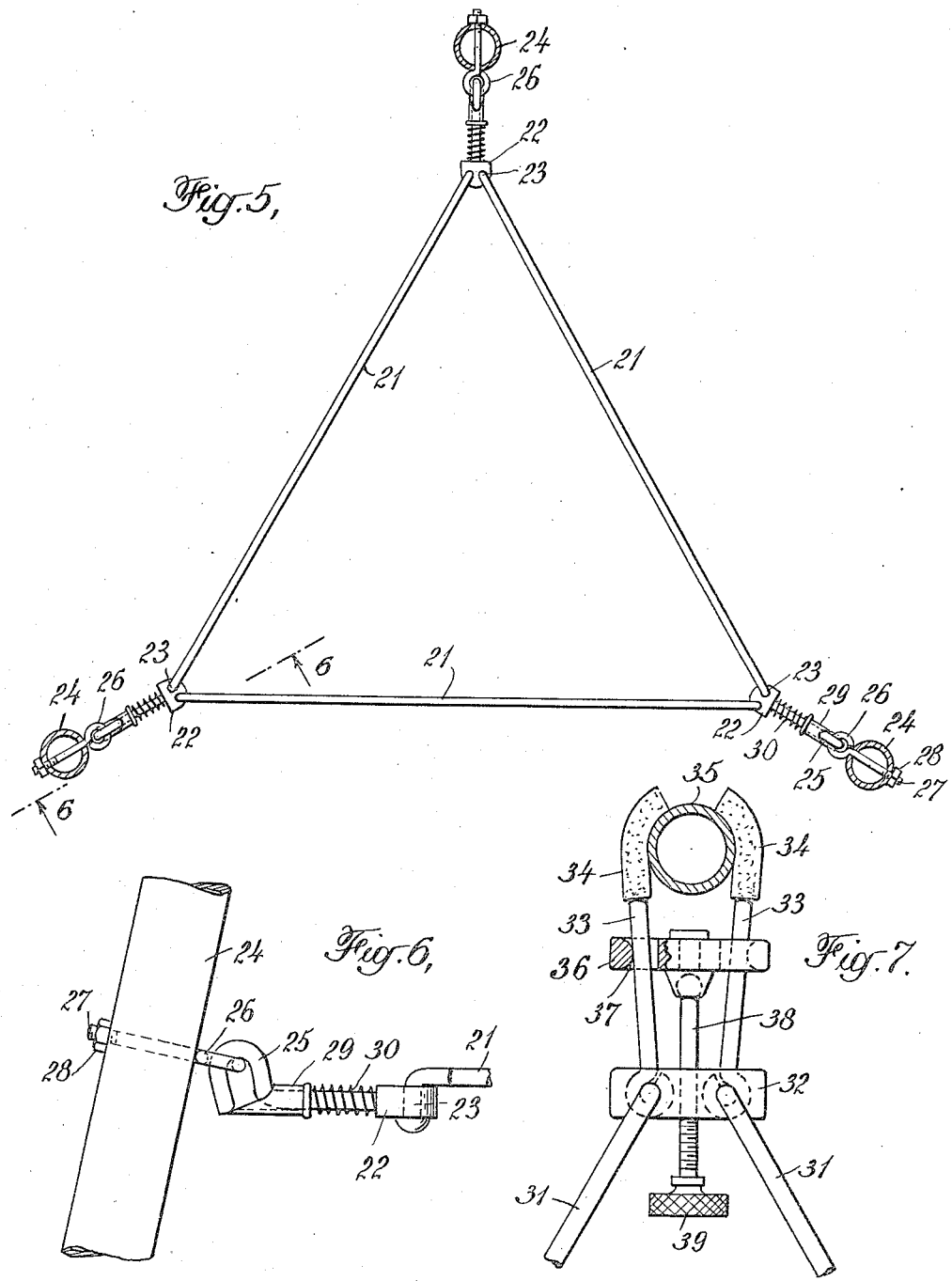

Patented Oct. 24, 1939

2,177,246

UNITED STATES PATENT OFFICE 2,177,246

TRIPOD STABILIZER

Victor G. Ellis, New York, N. Y., assignor to Ellis & Beller, Inc., New York, N. Y., a corporation of New York Application January 28, 1938, Serial No. 187,340

2 Claims. (Cl. 248—192)

This invention relates to tripods for cameras and particularly to a device adapted to stabilize such tripods affording rigidity and consequent security for the camera supported thereon.

Camera tripods are generally, because of the need for limiting their weight, of relatively light construction, and they tend, consequently, to be unstable, that is to say, they may be overturned by wind or by accidental impact of extraneous objects. Cameras of quite expensive construction are often mounted on such tripods, and are subject to possible injury of a more or less substantial nature if a tripod is accidentally overturned.

It is the object of the present invention to provide a simple and inexpensive attachment which may be secured readily to the tripod when it is set up to connect the legs rigidly to provide therefor stability which is not otherwise possible.

Another object of the invention is the provision of connecting means adapted to engage the tripod legs, which permits easy attachment or separation of the device and adjustment of the legs of the tripod when the device is in use.

Other objects and advantages of the invention will be apparent as it is better understood by reference to the following specification and accompanying drawings, in which Fig. 1 is a view in perspective illustrating a tripod with the stabilizer in use;

Fig. 2 is a plan view of one form of the stabilizer with the tripod legs in section to illustrate the application of the device;

Fig. 3 is an enlarged plan view partially in section of one of the connecting devices;

Fig. 4 is an enlarged section on the line 4—4 of Fig. 2;

Fig. 5 is a plan view of a slightly modified form of the stabilizer;

Fig. 6 is an enlarged elevation of one of the connecting devices on the line 6—6 of Fig. 5; and Fig. 7 is a plan view partially in section of a modified form of connector.

Referring to the drawings, a tripod consisting of legs 5 pivotally connected to a head 6, is typical of the ordinary construction of camera tripods. In the particular form illustrated, the legs 5 have extensions 7 which telescope in the legs 5 and are secured by set screws 8. It will be understood that the particular construction of the tripod forms no part of the present invention, and that the stabilizer may be utilized with tripods of any construction. The stabilizer is indicated at 9. When attached to the tripod in the manner indicated, it holds the legs rigidly and reduces any tendency of the tripod to overturn.

In Figs. 2 to 4 inclusive of the drawings, a preferred form of the stabilizer is illustrated, comprising arms 10 and 11 and a third member consisting of two parts 12 and 13 which are adapted to be connected by a knurled sleeve 14 having an internal thread adapted to be engaged by the threaded end 15 of the part 13 to form a rigid triangle which is adapted to brace the tripod.

At each of the three corners of the stabilizer, the connecting arms engage pivots 16. The ends of the arms are provided with ferrules 17. Also supported on the pivots 16 are a pair of clamps 18 which are crossed and shaped to engage the extension 7 of the tripod leg. Preferably, the clamps are provided with resilient covers 19 of rubber or other suitable material to provide additional frictional engagement and also to prevent injury to the tripod leg. The ends 20 of the arms forming the stabilizer are bent so as to engage the respective clamping elements 18, and when the arms are secured in the triangular form illustrated in Fig. 2, the clamping elements will be held firmly in engagement with the tripod legs. Preferably the arms of the stabilizer are slightly bowed to give additional resilience, thus affording a degree of adjustment to the clamping elements and ensuring rigid engagement with the tripod legs. The clamping elements may be bent by the user so as to conform with the size of the tripod leg to further assure close engagement and a rigid support.

Normally, the parts 12 and 13 are disconnected, and the stabilizer can be folded readily so as to occupy a relatively small amount of space. When the tripod is set up, the stabilizer may be unfolded. The clamping elements may be adjusted readily about the legs of the tripod before the parts 12 and 13 are brought into position to permit engagement of the threaded end 15 of the arm 13 with the sleeve 14. When the parts are engaged and the sleeve is turned to join the two parts 12 and 13, the stabilizer becomes rigid and securely holds the tripod legs. The stabilizer can be readily disconnected from the tripod by simply turning the sleeve 14 until the parts 12 and 13 are again separated.

Referring to Figs. 5 and 6 of the drawings, the arms 21 of the stabilizer are each pivotally connected to clamping devices 22. The end 23 of one of the arms 21 may be loose in the corresponding opening in the clamping device 22, so that it may be readily separated, the other arms being preferably riveted at their ends. In this form of the device, the clamping devices and the connecting arms are relatively movable to a sufficient extent to permit some adjustment of the tripod legs 24 after the stabilizer has been connected to the tripod.

The clamping devices comprise hooks 25 which are adapted to engage eyes 26 secured to the tripod legs 24 by bolts 27 which are held by nuts 28. Supported on the hooks 25 are sleeves 29 normally biased by springs 30 to the position indicated in Fig. 6, in which position the hooks are closed to prevent disconnection of the stabilizer from the tripod. By pushing the sleeves 29 backwardly against the springs 30 and turning them through an angle of approximately 180°, the sleeves will be held in such a position as to permit separation of the hooks 25 from the eyes 26.

This form of the stabilizer is collapsible by simply removing the end 23 from the corresponding opening in the clamping device 22. The stabilizer may be folded, then, to occupy a relatively small space. When the tripod has been set up, the stabilizer is unfolded and the end 23 is engaged in its opening. The hooks 25 may be passed through the eyes 26 and the sleeves 29 may be adjusted then to permit separation of the hooks from the eyes. The tripod is then held with sufficient rigidity, but because of the use of double pivots at the respective corners of the triangle, some relative adjustment of the legs 24 is possible, thus facilitating leveling of the camera.

In Fig. 7, I have illustrated a slightly different form of clamping device which may be substituted for the device illustrated in Figs. 5 and 6. The arms 31 are pivotally connected to a bar 32 at each corner of the triangular stabilizer. Clamping elements 33 are similarly pivotally connected to the bar 32 and are provided preferably with resilient sleeves 34 adapted to engage the tripod leg 35. Adjustment of the clamping elements is effected by a movable bar 36 having openings 37 therein through which the clamping elements pass. The movable bar is connected to a screw 38 which is threadedly engaged with the bar 32 and is provided with a knurled head 39. By adjusting the screw 38, the bar 36 may be moved in either direction to secure or release the clamping elements 33. Preferably, the screw 38 is only threaded on the portion adjacent the knurled head 39, so that the movement of the bar 36 is effected rapidly until the threads are engaged for the purpose of forcing the clamping elements 33 into clamping engagement with the legs 35.

The several forms of the stabilizer and clamping devices as herein illustrated and described are those which lend themselves most readily to the accomplishment of the desired purpose. The stabilizer in either of its simple forms can be quickly applied to substantially any camera tripod and will afford stability which otherwise cannot be easily secured. The use of the stabilizer ensures against injury to expensive cameras, and thus repays the relatively slight effort necessary to apply the stabilizer to the tripod whenever the latter is set up for use.

Various changes may be made in the form, arrangement and construction of the parts of the stabilizer without departing from the invention or sacrificing the advantages thereof.

I claim:

1. A stabilizer for camera tripods comprising articulated arms adapted to form a triangular brace, clamping means associated with the arms consisting of opposed members pivotally supported and means on the arms engaging the opposed members to hold them in gripping relation.

2. A stabilizer for camera tripods comprising articulated arms adapted to form a triangular brace, one of the arms being in two parts with manually operable means for connecting them, clamping means associated with the arms consisting of opposed members pivotally supported, and means on the arms engaging the opposed members to hold them in gripping relation.

VICTOR G. ELLIS.